United States Patent
Hickson et al.

(10) Patent No.: US 6,978,400 B2
(45) Date of Patent: Dec. 20, 2005

(54) METHOD, APPARATUS AND COMPUTER PROGRAM FOR REDUCING THE AMOUNT OF DATA CHECKPOINTED

(75) Inventors: Andrew I Hickson, West Wellow (GB); Richard S Maxwell, Romsey (GB); David Ware, Downton (GB)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 10/232,251

(22) Filed: Aug. 29, 2002

(65) Prior Publication Data

US 2004/0078659 A1      Apr. 22, 2004

(30) Foreign Application Priority Data

May 16, 2002   (GB) .................................. 0211179

(51) Int. Cl.[7] ............................................. G06F 11/00
(52) U.S. Cl. ......................................... 714/37; 714/13
(58) Field of Search ................................ 714/37, 13, 6, 714/7, 15, 20, 42, 54; 707/200, 201, 203; 711/133, 134

(56) References Cited

U.S. PATENT DOCUMENTS

| | | | | |
|---|---|---|---|---|
| 5,440,726 A | * | 8/1995 | Fuchs et al. ................... | 714/20 |
| 5,465,328 A | | 11/1995 | Dievendorff et al. ........ | 395/182 |
| 5,561,798 A | * | 10/1996 | Haderle et al. ............. | 707/202 |
| 5,590,277 A | * | 12/1996 | Fuchs et al. .................. | 714/38 |
| 5,712,971 A | * | 1/1998 | Stanfill et al. ................ | 714/34 |
| 5,745,905 A | * | 4/1998 | Larsson et al. ............. | 707/203 |
| 6,173,292 B1 | * | 1/2001 | Barber et al. ............... | 707/200 |

FOREIGN PATENT DOCUMENTS

WO        WO 95/10805        4/1995

* cited by examiner

Primary Examiner—Nadeem Iqbal
(74) Attorney, Agent, or Firm—David A. Mims, Jr.

(57) ABSTRACT

The invention relates to a method, apparatus and computer program for reducing the number of data elements checkpointed in a system having at least one data store where operations on said at least one data store are recorded in a log. A point in the log is recorded. The oldest data element in each of the least one data store is determined and it is then determined for each of the at least one data store whether a logged representation of the data store's oldest data element is more recent than the point recorded. Responsive to determining that a data store's logged representation is more recent than the point recorded, it is realised that it is not necessary to force data elements from that data store to disk if the point recorded is made the point of restart for that data store.

20 Claims, 6 Drawing Sheets

| Tail | Head | Next Sequence Number | Sequence Number Array (S0 to Sn) | Queue Restart LSN |
|------|------|----------------------|----------------------------------|-------------------|
|      |      |                      |                                  |                   |

Figure 3b

| LSN Array (L0 to Ln) | System Restart LSN |
|----------------------|--------------------|
|                      |                    |

Figure 3c

METHOD, APPARATUS AND COMPUTER PROGRAM FOR REDUCING THE AMOUNT OF DATA CHECKPOINTED

FIELD OF THE INVENTION

The present invention relates, to a method, apparatus and computer program for reducing the amount of data checkpointed in a data processing environment.

BACKGROUND TO THE INVENTION

Asynchronous transfer of messages between application programs running different data processing systems within a network is well known in the art, and is implemented by a number of commercially available messaging systems. These systems include IBM Corporation's MQSeries family of messaging products, which use asynchronous messaging via queues. A sender application program issues a PutMessage command to send (put) a message to a target queue, and MQSeries queue manager programs handle the complexities of transferring the message from the sender to the target queue, which may be remotely located across a heterogeneous computer network. The target queue is a local input queue for another application program, which retrieves (gets) the message from this input queue by issuing a GetMessage command asynchronously from the send operation. The receiver application program then performs its processing on the message, and may generate further messages. (IBM and MQSeries are trademarks of International Business Machines Corporation).

Messaging products such as MQSeries provide for assured once and once-only message delivery of messages even in the event of system or communications failures. This is achieved by not finally deleting a message from storage on a sender system until it is confirmed as safely stored by a receiver system, and by the use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. Pat. No. 5,465,328.

One key aspect of providing such an assured delivery of messages capability is the maintenance of a log in each system. A log is used to keep track of completed message activity and because a log is typically maintained a direct access non-volatile storage device (such as a hard disk drive), the information stored therein is permanently accessible. The log can therefore be used to recover the state of a system (i.e. queue(s) state) in the event of a failure thereof. Each time a recoverable message is sent to a queue, a record that the message was sent, including the message data, is written to the log, and each time a message is retrieved from a queue, a record that the message was retrieved is written to the log. In the event of a failure, the log is replayed to recover each queue to the state it was in at the point when the failure occurred.

A queue's message throughput in such a system can however be high. Further a log may be recording message activity for more than one queue. Consequently a large number of operations may be written to the log and having to replay the whole log at restart would not be feasible (this may involve replaying millions of records). In order to avoid the need to replay the entire log at restart, the queue manager periodically writes consolidated queue manager state to disk. This process is known as checkpointing. The data written at checkpoint time allows the queue manager to restart using only data that was written to the log relatively recently. A checkpoint typically hardens the current state of all queues which have changed since the previous checkpoint to permanent storage (disk).

FIGS. 1a and 1b illustrate a simplified view of logging and checkpointing according to the prior art. In FIG. 1a the state of a queue is shown in steps 1 through 8 and FIG. 1b illustrates the corresponding operations written to the log.

At step 1, messages A, B and C are put to a queue. This is recorded in the log (+A, +B, +C). An application then removes B from the queue (step 2) and this is reflected in the log (−B). Message D is subsequently added to the queue and so the queue now contains messages A, C and D (step 3). At this point the system takes a checkpoint by forcing the current state of the queue (as shown) to disk (step 4). A start checkpoint marker is placed in the log and only when checkpointing has completed is an end check point marker placed therein.

Whilst checkpointing is taking place, messages continue to be put and got from the queue and these operations are recorded in the log between the start and end markers. Thus, at step 5 message E is added to the queue and the log (+E). A is then removed from the queue (step 6) and recorded in the log (−A). At step 7, F is put to the queue and at step 8 C is removed from the queue. Once again this is all recorded in the log (+F, −C). At this point checkpointing finishes and the end checkpoint marker is placed in the log. Messages continue to be put and got from the queue and these operations recorded in the log (+G, −F). It is after F is got from the queue that the system fails and the current state of the queue (D E G) must be recovered.

As previously mentioned the whole log could be replayed in order to return the queue to its lost state. However, this would involve a large number of operations and is wasteful of both time and processing power. Thus because the consolidated state written to disk at step 4 (e.g. A C D) is recoverable, the operations stored in the log need only be replayed from the start checkpoint marker to the end of the log. Thus in this instance, A, C and D are safely on disk and only six operations have to be replayed to restore the queue. This is instead of 11 operations if the log had had to be replayed from the beginning.

Note, whilst FIG. 1a shows A, C and D being forced to disk at step 4, this is not necessarily the case. In reality what is forced to disk could be any queue state occurring between the start checkpoint marker and the end checkpoint marker. In any case checkpointing is well-known in the art and thus this should be understood by the skilled person.

Obviously FIGS. 1a and 1b show a greatly simplified view of the processing that takes place. It will be appreciated that in reality the message throughput in a messaging system will typically be far greater and that as a result the number of operations logged will be far larger. Consequently checkpoints have to be taken relatively frequently and because checkpointing involves forcing I/O it is expensive, especially considering that failures are rare occurrences and thus the majority of checkpoint data written will never be called upon.

SUMMARY OF THE INVENTION

Accordingly the invention provides a method reducing the number of data elements (e.g. messages) checkpointed in a system (e.g. a messaging system) having at least one data store (e.g. queue), operations on said at least one data store being recorded in a log, the method comprising the steps of: recording a point in the log; determining the oldest data element in each of the least one data store; determining for each of the at least one data store whether a logged representation of the data store's oldest data element is more recent than the point recorded; and responsive to determining that a data store's logged representation is more recent than the point recorded, realising that it is not necessary to force data elements from that data store to disk if the point recorded is made the point of restart (e.g. in the event of a failure) for that data store.

Checkpointing involves forcing I/O and so is expensive. Failures are rare occurrences and so the majority of checkpoint data written will never be called upon. Any way of lessening the amount of data checkpointed is useful and if the oldest of a data store's data elements is more recent in the log than the point recorded, then all data elements in the store are recoverable if the log is replayed from this point.

The term disk as used herein with reference as to whether data elements are forced thereto or otherwise, should be taken to mean a data store from which the forced data elements can be recovered.

In a preferred embodiment, responsive to deciding not to force data elements as a result of determining that it is not necessary to do so, making the point recorded the point of restart for that data store.

In one embodiment, responsive to determining that a data store's logged representation is older than the point recorded, data elements from that data store are forced to disk and the point at which data elements were forced is made the point of restart for that data store.

In another embodiment, responsive to determining that a data store's logged representation is older than the point recorded, this recorded point is made the point of restart for that data store and data elements from the data store are forced to disk.

In one embodiment the point of system restart, in the event of a failure, is the point recorded.

The point of restart is preferably determined for each data store. Further preferably the oldest restart point of all the data stores is determined and this oldest restart point is made the system restart point (e.g. in the event of a failure).

In one embodiment, the step of determining the oldest data element in the at least one data store is responsive to determining that according to at least one predetermined criterion it is time to take a checkpoint. One criterion might be that the log is p % full; x operations have been carried out; or m minutes have passed.

In one embodiment, the point recorded is the point at which it is determined that it is time to take a checkpoint and the step of determining the oldest data element in each of the at least one data store is responsive to waiting a predetermined period of time over and above time at which the point is recorded.

In one embodiment, a plurality of points, subsequent to a previous system restart point in the log, are recorded. It is determined for each of the at least one data store whether a logged representation of the data store's oldest data element is more recent than any of the recorded points and responsive to determining that a data store's logged representation is more recent than at least one of the recorded points, it is realised that it is not necessary to force data elements from that data store to disk if the newest (most recent) of said points is made the restart point for that particular data store.

In one embodiment, responsive to deciding not to force any data elements for that data store as a result of realising that it is not necessary to do so, the newest of the points is made the restart point for that particular data store.

If no such point is found for a data store, the point at which the data store's data elements was forced to disk may be made the point of restart for that data store.

The other embodiment provides a higher chance that data elements will not have to be forced to disk. This is because there is more than one point against which the oldest message in a data store is compared.

Preferably a new restart point is determined for all data stores in the system (i.e. a restart point that ensures data integrity for the whole system in the event of a failure). This may involve making the earliest data store restart point, the system restart point. Alternatively the system restart point may be the newest recorded point for a predetermined number of data stores where a logged representation of the oldest data element in each of those data stores is more recent than this point. In this instance, the data elements in all other data stores are preferably forced to disk.

In one embodiment, responsive to determining that a data store has fewer than a predetermined number of data elements therein, that data store's data elements are forced to disk and the point at which the data elements are forced is made the point of restart for that data store. This may be done because forcing a relatively small amount of data to disk is acceptable and allows the point of restart for that data store (and potentially for the whole system) to progress.

In another embodiment, it may be possible to advance the system restart point. This may be achieved by recording, for each data store, when a data element is put to an empty data store (this provides a known state). It is then determined whether at least one empty data store point is more recent than the system restart point. From such at least one more recent empty data store point, the newest empty data store point for which a representation of the oldest data element in each of a predetermined number of data stores is more recent, is determined. The determined empty data store point, is made the system restart point. The predetermined number of data stores may be all data stores. However, if this is not the case then the data elements of any other data stores are preferably forced to disk.

In one embodiment each data store has storage associated therewith, the storage indicating the oldest data element in the associated data store, and wherein the step of determining the oldest data element in each of the at least one data store comprises using the storage associated with the appropriate data store. This provides a quick and easy way of determining the oldest data element in a store.

According to another aspect the invention provides an apparatus for reducing the number of data elements checkpointed in a system having at least one data store, operations on said at least one data store being recorded in a log, the apparatus comprising: means for recording a point in the log; means for determining the oldest data element in each of the least one data store; means for determining for each of the at least one data store whether a logged representation of the data store's oldest data element is more recent than the point recorded; and means, responsive to determining that a data store's logged representation is more recent than the point recorded, for realising that it is not necessary to force data elements from that data store to disk if the point recorded is made the point of restart for that data store.

According to another aspect, the invention provides a method for reducing the number of data elements checkpointed in a system having at least one data store, operations on said at least one data store being recorded in a log, the method comprising the steps of: recording a plurality of points in log; determining for each of the at least one data store whether a logged representation of the data store's oldest data element is more recent than any of the recorded points; and responsive to determining that a data store's logged representation is more recent than at least one of the recorded points, realising that it is not necessary to force data elements from that data store's logged representation to disk if one of said at least one points (preferably the newest) is made the restart point for that particular data store.

According to another aspect, the invention provides an apparatus for reducing the number of data elements checkpointed in a system having at least one data store, operations on said at least one data store being recorded in a log, the apparatus comprising: means for recording a plurality of points in log; means for determining for each of the at least one data store whether a logged representation of the data store's oldest data element is more recent than any of the recorded points; and means, responsive to determining that a data store's logged representation is more recent than at least one of the recorded points, for realising that it is not necessary to force data elements from that data store's logged representation to disk if one of said at least one points (preferably the newest) is made the restart point for that particular data store.

The invention preferably provides a quick and easy way of determining whether it is necessary to force data to disk based on the position of a data store's data relative to a recorded point, of course, despite it not being necessary to force data in some situations, the system may still choose to do so (for example, in order to progress a restart point).

It will be appreciated that the invention may be implemented in computer software.

BRIEF DESCRIPTION OF THE DRAWINGS

Embodiments of the present invention will now be described by way of example only and with reference to the following drawings:

FIGS. 3a, 3b and 3c illustrate processing according to a second embodiment of the present invention;

DETAILED DESCRIPTION

As discussed above, checkpointing is an expensive process. A failure is typically a rare occurrence and so much of the data checkpointed is never used.

It has been observed that the majority of queues in a messaging system hold messages very transiently (only until the messages can be forwarded to their intended destination) and that it is therefore extremely likely that by the time a checkpoint has been taken (or very shortly afterwards), the messages forced to disk as a result of that checkpoint no longer exist on the relevant queue (i.e. the state information is out of date). This observation has permitted an improvement to the whole process which reduces the amount of data that is forced to disk during a checkpoint.

Figure 1A:
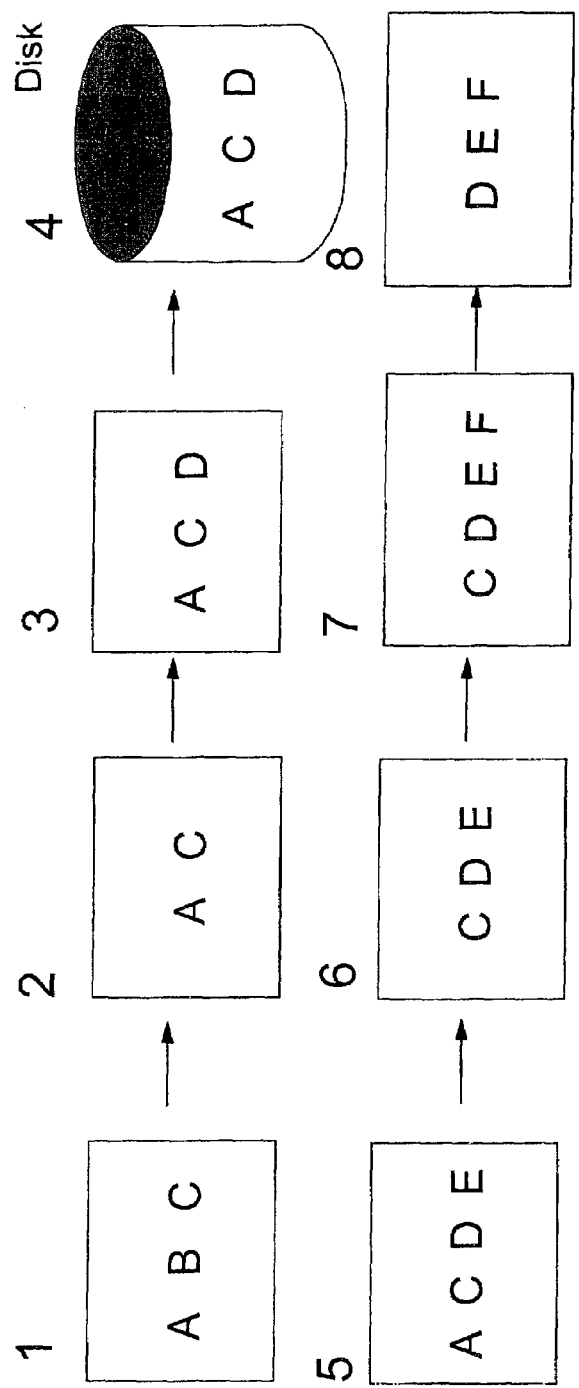
FIGS. 1a and 1b illustrate a simplified view of logging and checkpointing according to the prior art.
Figure 1B:
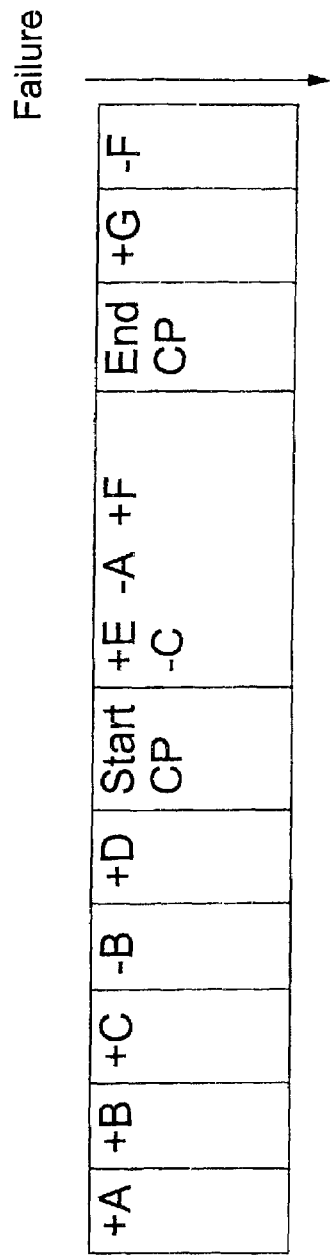
Figure 2A:
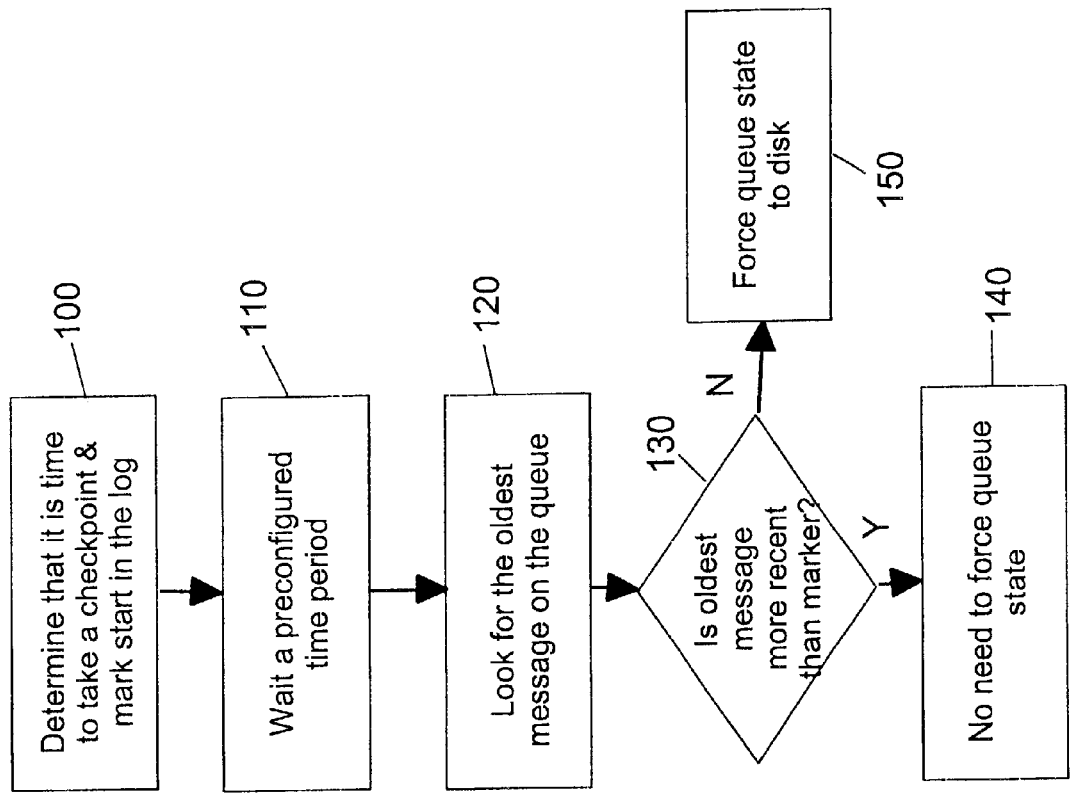
FIGS. 2a, 2b and 2c illustrate processing according to a first embodiment of the present invention.
Figure 2B:
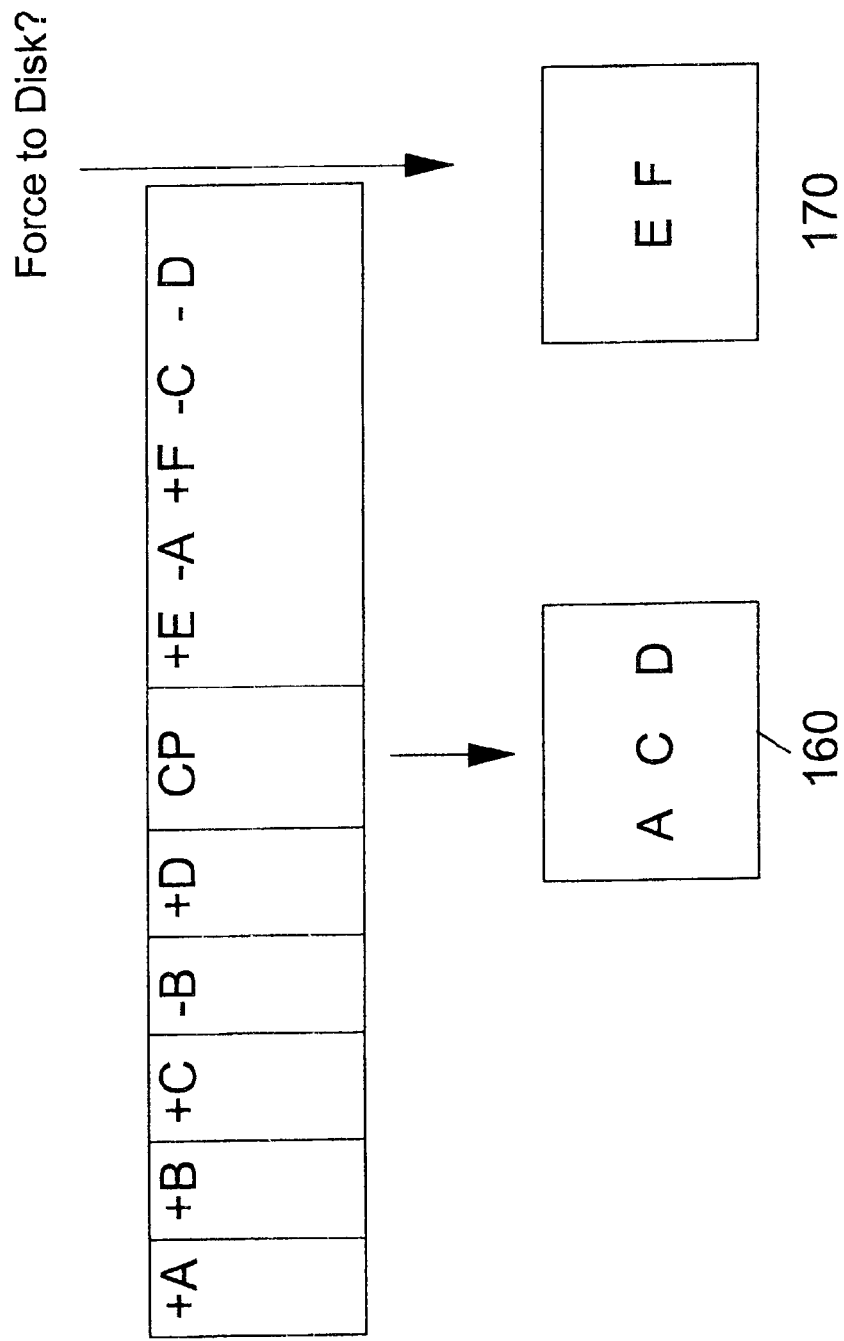

A first embodiment of the present invention is described with reference to FIGS. 2a; 2b and 2c. A checkpoint is typically taken every x operations; m minutes; or when the log is a p % full. It is determined at step 100 of FIG. 2a that according to one of the aforementioned criteria it is time to take a checkpoint and this is marked in the log (CP marker). (At this point (160) the queue of FIG. 2b has messages A; C; and D on it.) However, instead of actually forcing data to disk the system waits a preconfigured period of time (step 110). Operations continue to be written to the log during this time period (+E −A+F −C −D) and having waited the appropriate amount of time, the system checks the queue for the oldest recoverable message (step 120). The position of this message in the log then determines whether or not the state of the queue needs to be forced to disk (e.g. the state shown at 160 of FIG. 2b).

Figure 2C:
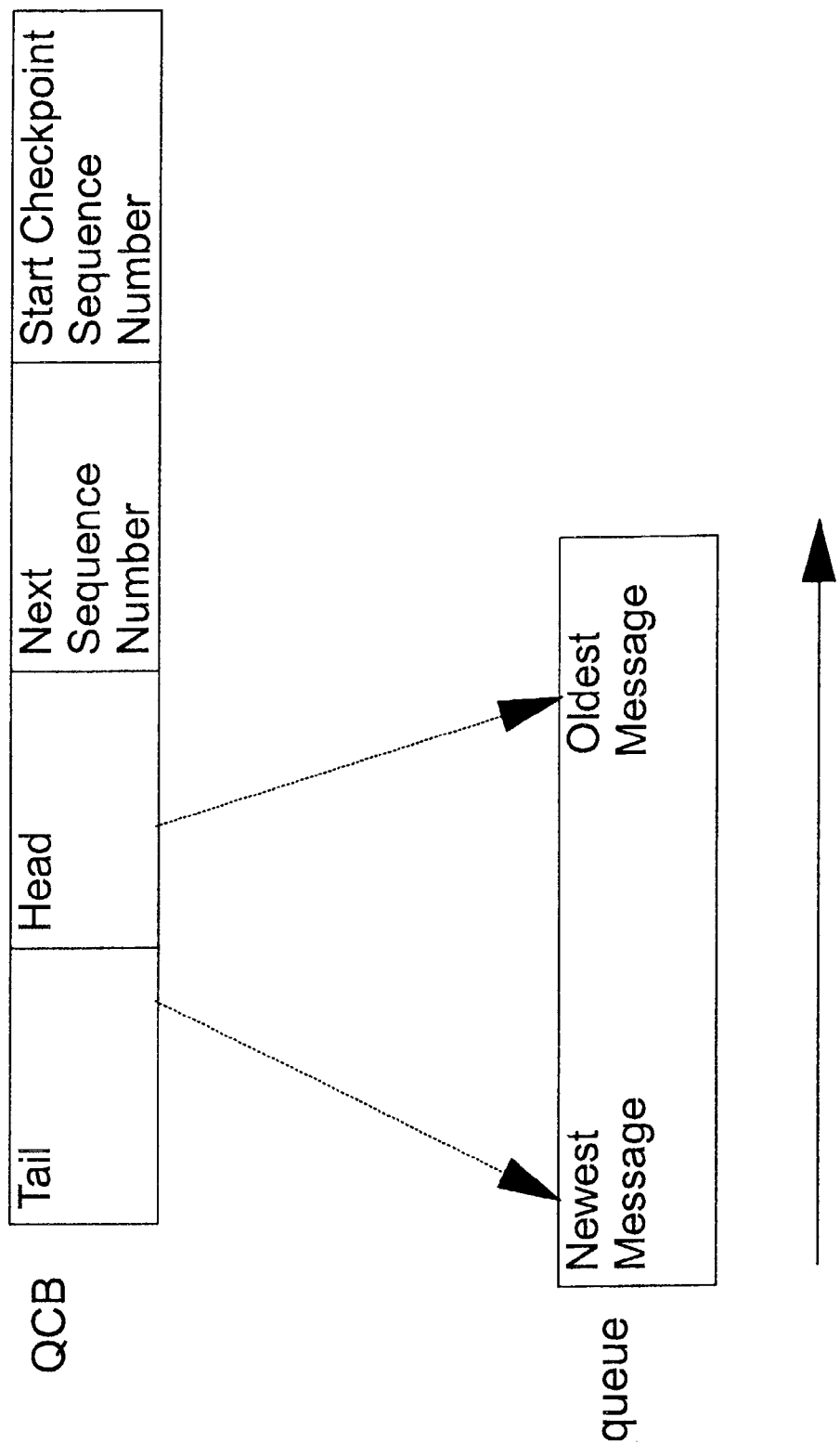

Each queue has a queue control block (QCB) and FIG. 2c shows how this is used to determine where in the log the oldest message on the queue sits (step 130). Messages are typically added to a queue in a first in first out (FIFO) order. Thus the newest message on the queue is at the tail of the queue and is pointed to by a tail field in the QCB. The oldest message on the queue is at the head and is pointed to by a head field in the QCB. The QCB also has a next sequence number field. Each message on a queue is assigned a sequence number in a monotonically increasing order and a message's number can be discovered by examining that message. (Note, sequence numbers are only unique within a queue). The next sequence number field in the QCB is used to allocate a new sequence number to each message (one is added to the previous sequence number allocated).

At the point of placing the CP marker in the log (i.e. step 100) the system makes a note of the next sequence number that it is going to allocate to a message on the relevant queue in a start checkpoint sequence number field of each QCB. In order to determine whether the oldest message on a queue is older, or more recent than the point at which a CP marker was placed in the log, the head field's pointer is used to find the oldest message on the queue. This message can then be examined to determine its sequence number and this number is compared with the sequence number in the start checkpoint sequence number field of that queue's QCB. If the two are equal, or if the oldest message's sequence number is greater, then all the messages on the queue are more recent than the CP marker and are therefore easily recoverable. In this instance, there is no need to force any data to disk during the checkpoint (step 140). This is because none of the messages on the queue at the beginning of the preconfigured time period are still on the queue at the end of that time period. With the example shown in FIG. 2b messages A C and D (160) have all been removed from the queue by the time the system makes the decision as to whether to force the queue's state to disk. The queue now has only messages E and F thereon (170). Since the oldest message on the queue E is more recent than the CP marker, there is no need to force any data to disk. The CP marker becomes the point at which the log is replayed from (i.e. the point of restart) in the event of a failure.

On the other hand, if the oldest message is less recent than the CP marker, then it is not easily recoverable. In this instance the current state of the queue does need to be forced to disk such that it is readily available in the event of a system failure.

It should be appreciated from the above that systems generally have more than one queue and thus in the prior art data is typically forced to disk during a checkpoint for each queue. According to the present invention, it is preferably necessary to check the position of the oldest recoverable message on each queue relative to the CP marker to determine whether data for that queue needs to be forced to disk.

At restart all records forward of the CP marker are replayed to restore the system to the state it was in at the time of system failure.

An alternative to marking the log with a CP marker and waiting a preconfigured period of time, is to remember a point in the log (not necessarily mark it) a certain amount prior to the point at which a checkpoint is typically taken. (Log records are allocated log sequence numbers (LSNs) and it is an LSN that is remembered. LSNs are described below.) Whether any data is forced at that checkpoint depends on the position of the oldest message on each queue relative to the point remembered. The point remembered is the point of restart for the system.

Figure 3A:
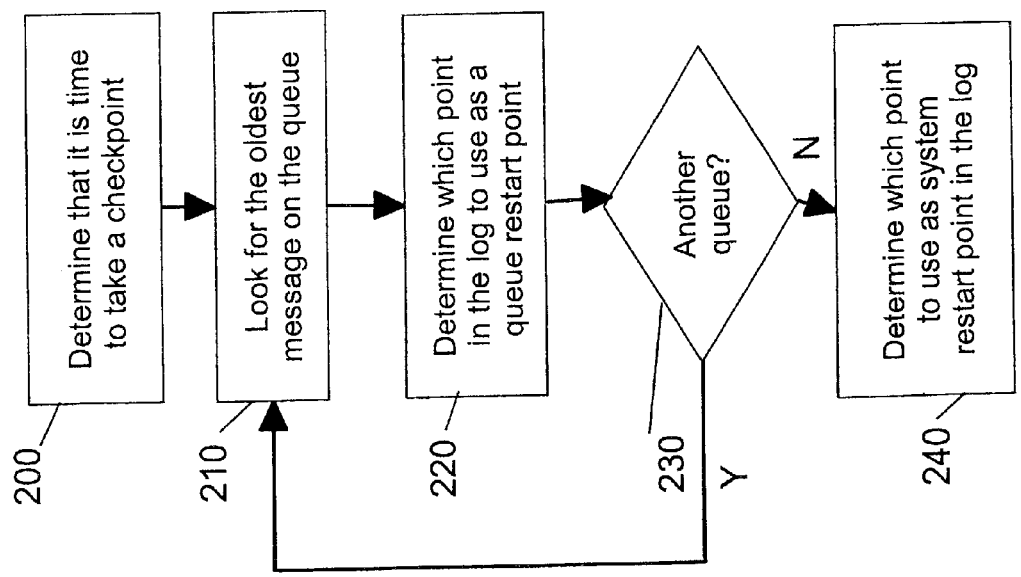

FIGS. 3a; 3b; and 3c show processing according to a second embodiment of the present invention. Each record in the log is referenced by a log sequence number (LSN). Every x operations/m minutes in the log, the next LSN to be allocated is stored in an array of LSN (FIG. 3c). As before each queue has a QCB associated therewith, but in this instance each QCB has an array for message sequence numbers SO through to Sn. Just after each LSN is recorded in the LSN array, the next sequence number to be allocated to a message put to a queue is stored in this array. Thus each sequence number array element maps to a system wide Log Sequence Number (LSN) array element (point in the log). (Once again each QCB has a next sequence number field from which each message sequence number is allocated.)

At step 200 it is determined that it is time to take a checkpoint. (Note, there is no need to actually mark this point in the log for recovery purposes, although a marker might still be useful for other reasons.) At step 210, the system looks for a queue's oldest message. The sequence number associated with this oldest message is then compared with values stored in the sequence number array to find the number nearest but not greater than the oldest message sequence number. Using the LSN array, this number can then be mapped to an LSN which would allow that queue to be restarted without any data having to be forced to disk (step 220). This process is then repeated for each queue to determine a notional point of restart for each queue (steps 230; 210). (Note, as before a message sequence number is only unique within a queue and as with message sequence numbers, LSN's are allocated in a monotonically increasing order.)

Having determined a notional point of restart for each queue (queue restart LSN) and stored this in the relevant queue's QCB, a restart LSN has to be determined for the whole system (system restart LSN) (step 240). This is the point in the log that would give data integrity following a system failure (i.e. the lowest queue restart LSN). The relevant LSN is therefore made the system restart LSN for the whole system and is stored in the system restart LSN field (FIG. 3c).

For some queues data may need to be forced to disk. The rule is that the point of restart for the system must always progress forwards in the log from a previous system wide restart point (see below). Thus if a queue's (queue A) oldest message is older than a previous checkpoint, then its data is not easily recoverable and its state is therefore hardened to disk. Having hardened queue A's data, the restart point for queue A will be the point at which the data was forced. Note, if queue A's point of restart has still not progressed at the subsequent checkpoint, then that queue's data will have to be hardened to disk once more.

Determining which queues to harden and which LSN is to be the system restart LSN may in another embodiment take a number of other factors into account. For example, the system restart LSN may be determined by the LSN which would allow restart for the majority of queues without forcing to disk being necessary. With certain queues, it may be determined that the amount of data thereon is only small and so forcing to disk is not a problem.

An additional minor enhancement will now be described which is applicable to both embodiments described. Again due to the transient nature of message, the state of an active queue typically oscillates frequently between empty and non empty (unlike a database where it is rare for a database to ever be empty). It has been observed that an empty queue also provides a known state from which recovery can be attempted. This fact can thus be used to progress the point of restart in the log yet further.

Every time a message is put to an empty queue its sequence number is recorded and mapped to an LSN used to record that operation in the log is recorded in an QCB array for that queue (Empty.LSN).

It is determined whether one queue's Empty.LSN would progress the point of restart forward, whilst still allowing all the other queues to restart from the progressed point with data integrity. In other words, the relevant Empty.LSN must be more recent than the current system restart LSN but older than the oldest message on the majority (or all) queues. For example, in the first embodiment if the sequence went +A+B+C CP −A −B −C+E+F. E is the oldest message on the queue and is more recent than the CP marker so is therefore recoverable without data needing to be forced to disk. The CP marker is the point of restart as previously described. However, E was put to an empty queue thus the point of restart can actually be progressed to this point.

Of course, it may be determined that in order to progress the point of restart further some queues have to have their data forced to disk (where they wouldn't have needed to before). This is a trade-off that may be worth making.

One of the effects of this invention according to the embodiments described is that the restart point may be earlier than it would have been if all of the new queue data had been hardened at every checkpoint. This could cause increased restart times. However it can also be argued that the reduced checkpoint costs allow checkpoints to be taken more often thereby reducing restart times.

Note, the restart process itself following a failure is unchanged from prior art methods and will therefore be obvious to one skilled in the art.

It should be appreciated that although the present invention is described in the context of a messaging system, no such limitation is intended. The invention is applicable to any environment in which checkpointing is used.

What is claimed is:

1. A method for reducing the number of data elements check pointed in a system having at least one data store, operations on said at least one data store being recorded in a log, the method comprising the steps of:

recording a point in the log;

determining the oldest data element in each of the at least one data store responsive to determining that according to at least one predetermined criterion it is time to take a checkpoint;

determining for each of the at least one data store whether a logged representation of the data store's oldest data element is more recent than the point recorded;

responsive to determining that a data store's logged representation is more recent than the point recorded, realising that it is not necessary to force data elements from that data store to disk if the point recorded is made the point of restart for that data store; and wherein the point recorded is the point at which it is determined that it is time to take a checkpoint and wherein the step of determining the oldest data element in each of the at least one data store is responsive to waiting a predetermined period of time over and above time at which the point is recorded.

2. A method for reducing the number of data elements checkpointed in a system having at least one data store, operations on said at least one data store being recorded in a log, the method comprising the steps of:

recording a point in the log;

determining the oldest data element in each of the at least one data store;

determining for each of the at least one data store whether a logged representation of the data store's oldest data element is more recent than the point recorded; and responsive to determining that a data store's logged representation is more recent than the point recorded, realising that it is not necessary to force data elements from that data store to disk if the point recorded is made the point of restart for that data store;

responsive to deciding not to force data elements as a result of determining that it is not necessary to do so, making the point recorded the point of restart for that data store;

wherein a plurality of points, subsequent to a previous system restart point in the log, are recorded, the method further comprising the steps of:

determining for each of the at least one data store whether a logged representation of the data store's oldest data element is more recent than any of the recorded points, responsive to determining that a data store's logged representation is more recent than at least one of the recorded points, realizing that it is not necessary to force data elements from tat data store to disk if the newest of said points is made the restart point for that particular data store.

3. The method of claim 2, comprising the step of:

responsive to deciding not to force any data elements for that data store as a result of realising that it is not necessary to do so, making the newest of said points the restart point for that particular data store.

4. The method of claim 2, comprising the step of:

responsive to determining that there is no such at least one point for a data store, forcing that data store's data elements to disk and making the point at which the data store's data elements were forced, the point of restart for that data store.

5. The method of 2, comprising the step of:

determining a new restart point for all data stares in the system.

6. The method of claim 5, wherein the step of determining a restart point for all data stores in the system comprises the step of:

making the earliest data store restart point, the system restart point.

7. The method of claim 5, wherein the step of determining a restart point for all data stores in the system comprises the steps of:

determining the newest recorded point for a predetermined number of data stores where a logged representation of the oldest data element in each of those data stores is more recent than said point; and making that point the system restart point.

8. The method of claim 7, comprising the step of:

forcing to disk the data elements in all other data stores.

9. A method for reducing the number of data elements checkpointed in a system having at least one data store, operations on said at least one data store being recorded in a log, the method comprising the steps of:

recording a point in the log;

determining the oldest data element in each of the at least one data store;

determining for each of the at least one data store whether a logged representation of the data store's oldest data element is more recent than the point recorded; and responsive to determining that a data store's logged representation is more recent than the point recorded, realising that it is not necessary to force data elements from that data store to disk if the point recorded is made the point of restart for that data store;

recording, for each data store, when a data element is put to an empty data store;

determining whether at least one empty data store point is more recent than a restart point determined for the system;

from such at least one more recent empty data store point, determining the newest empty data store point for which a logged representation of the oldest data element in each of a predetermined number of data stores is more recent; and making said determined empty data store point, the system restart point.

10. The method of claim 9 comprising the step of:

forcing the data elements of any other data stores to disk.

11. An apparatus for reducing the number of data elements checkpointed in a system having at least one data store, operations on said at least one data store being recorded in a log, the apparatus comprising:

means for recording a point in the log;

means for determining the oldest data element in each of the at least one data store responsive to means for determining that according to at least one predetermined criterion it is time to take a checkpoint;

means for determining for each of the at least one date store whether a logged representation of the data store's oldest data element is more recent than the point recorded;

means, responsive to determining that a data store's logged representation is more recent than the point recorded, for realising that it is not necessary to force data elements from that data store to disk if the point recorded is made the point of restart for that data store; and wherein the point recorded is the point at which it is determined that it is time to take a checkpoint and wherein the means for determining the oldest data element in each of the at least one data store is responsive to means for waiting a predetermined period of time over and above time at which the point is recorded.

12. An apparatus for reducing the number of data elements check pointed in a system having at least one data store, operations on said at least one data store being recorded in a log, the apparatus comprising:

means for recording a point in the log;

means fix determining the oldest data element in each of the at least one data store;

means for determining for each of the at least one date store whether a logged representation of the data store's oldest data element is more recent than the point recorded; and means, responsive to determining that a data store's logged representation is more recent than the point recorded, for realising that it is not necessary to force data elements from that data store to disk if the point recorded is made the point of restart for that data store;

means, responsive to deciding not to force data elements as a result of determining that it is not necessary to do so, for making the point recorded the point of restart for that data store; and wherein a plurality of points, subsequent to a previous system restart point in the log, are recorded, the apparatus further comprising:

means for determining for each of the at least one data store whether a logged representation of the data store's oldest data element is more recent than any of the recorded points;

means, responsive to determining that a data store's logged representation is more recent than at least one of the recorded points, for realising that it is not necessary to force data elements from that data store to disk if the newest of said points is made the restart point for that particular data store.

13. The apparatus of claim 12, comprising:

means, responsive to deciding not to force any data elements for that data store as a result of realising that it is not necessary to do so, for making the newest of said points the restart point for that particular data store.

14. The apparatus of claim 12, comprising:

means, responsive to determining that there is no such as least one point for a data store, for forcing that data store's data elements to disk and making the point at which the data store's data elements were forced, the point of restart for that data store.

15. The apparatus of claim 12, comprising:

means for determining a new restart point for all data stores in the system.

16. The apparatus of claim 15, wherein the means far determining a restart point for all data stores in the system comprises:

means for making the earliest data store restart point, the system restart point.

17. The apparatus of claim 15, wherein the means for determining a restart point for all data stores in the system comprises:

means for determining the newest recorded point for a predetermined number of data stores where a logged representation of the oldest data element in each of those data stores is more recent than said point; and means for making that point the system restart point.

18. The apparatus of claim 17, comprising:

means for forcing to disk the data elements in all other data stores.

19. An apparatus for reducing the number of data elements checkpointed in a system having at least one data store, operations on said at least one data store being recorded in a log, the apparatus comprising:

means for recording a point in the log;

means for determining the oldest data element in each of the at least one data store;

means for determining for each of the at least one data store whether a logged representation of the data store's oldest data element is more recent than the point recorded; and means, responsive to determining that a data store's logged representation is more recent than the point recorded, for realising that it is not necessary to force data elements from that data store to disk if the point recorded is made the point of restart for that data store; and means for recording, for each data store, when a data element is put to an empty data store;

means for determining whether at least one empty data store point is more recent than a restart point determined for the system;

from such at least one more recent empty data store point, means for determining the newest empty data store point for which a logged representation of the oldest data element in each of a predetermined number of data stores is more recent; and means for making said determined empty data store point, the system restart point.

20. The apparatus of claim 19, comprising:

means for forcing the data elements of any other data stores to disk.

* * * * *